(12) United States Patent
Panikkar et al.

(10) Patent No.: US 11,799,641 B2
(45) Date of Patent: Oct. 24, 2023

(54) SYSTEM FUNCTIONALITY ACTIVATION USING DISTRIBUTED LEDGER

(71) Applicant: Dell Products L.P., Round Rock, TX (US)

(72) Inventors: Shibi Panikkar, Bangalore (IN); Teja Madhukar Manakame, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 160 days.

(21) Appl. No.: 17/152,043

(22) Filed: Jan. 19, 2021

(65) Prior Publication Data

US 2022/0231846 A1 Jul. 21, 2022

(51) Int. Cl.
| | | |
|---|---|---|
| H04L 9/08 | (2006.01) | |
| H04L 9/32 | (2006.01) | |
| H04L 9/00 | (2022.01) | |
| G06F 21/10 | (2013.01) | |

(52) U.S. Cl.
CPC ............ *H04L 9/0866* (2013.01); *G06F 21/10* (2013.01); *H04L 9/3236* (2013.01); *H04L 9/50* (2022.05); *G06F 2221/0742* (2013.01); *G06F 2221/0757* (2013.01)

(58) Field of Classification Search
CPC ....... H04L 9/0866; H04L 9/3236; H04L 9/50; G06F 21/10; G06F 21/105; G06F 2221/0742; G06F 2221/0757; G06F 2221/0762
See application file for complete search history.

(56) References Cited

U.S. PATENT DOCUMENTS

| | | | |
|---|---|---|---|
| 2011/0178888 A1* | 7/2011 | O'Connor ......... | G06Q 30/0601 705/317 |
| 2011/0178932 A1* | 7/2011 | Johnson ................. | G06Q 20/26 705/53 |
| 2011/0191765 A1* | 8/2011 | Lo ......................... | G06F 9/445 717/174 |
| 2017/0116693 A1* | 4/2017 | Rae ...................... | G06Q 50/184 |
| 2018/0183687 A1* | 6/2018 | Dementev .............. | H04L 41/50 |

(Continued)

OTHER PUBLICATIONS

A. Cojocaru, "Blockchain for Software License Management," https://www.itassetmanagement.net/2019/05/27/blockchain-for-slm/#:~:text=Using%20a%20Blockchain%20system%20for,fashion%20, May 27, 2019, 8 pages.

Y. Khatri, "Software License Management on a Blockchain Platform," https://www.coindesk.com/accenture-puts-software-license-management-on-a-blockchain-platform, Nov. 12, 2018, 5 pages.

(Continued)

*Primary Examiner* — Eric W Shepperd
(74) *Attorney, Agent, or Firm* — Ryan, Mason & Lewis, LLP

(57) ABSTRACT

Techniques for managing activation of functionalities in an information processing system are provided. For example, a method generates, at a first node in a distributed ledger network, at least one data object comprising data associated with a system and one or more unactivated functionalities of the system, and the data object further comprises one or more parameter fields configured for one or more other nodes in the distributed ledger network to subsequently insert data therein. The method obtains the at least one data object after data is inserted in the one or more parameter fields by the one or more other nodes. The method sends the at least one object to an additional node in the distributed ledger network for use in activating the one or more unactivated functionalities of the system.

20 Claims, 18 Drawing Sheets

(56) References Cited

U.S. PATENT DOCUMENTS

| | | | | |
|---|---|---|---|---|
| 2018/0203992 | A1* | 7/2018 | Kilpatrick | G06F 21/44 |
| 2018/0240107 | A1* | 8/2018 | Andrade | G06Q 20/36 |
| 2018/0240165 | A1* | 8/2018 | Kilpatrick | G06Q 30/04 |
| 2018/0314809 | A1* | 11/2018 | Mintz | H04L 9/3297 |
| 2019/0266553 | A1* | 8/2019 | Jacobson | G06Q 10/087 |
| 2019/0266563 | A1* | 8/2019 | Jacobson | H04L 9/0637 |
| 2019/0278254 | A1* | 9/2019 | Kumar | G06Q 30/0283 |
| 2019/0340269 | A1* | 11/2019 | Biernat | H04L 9/50 |
| 2019/0384842 | A1* | 12/2019 | Rao | G06F 16/27 |
| 2020/0250661 | A1* | 8/2020 | Padmanabhan | G06Q 20/3827 |
| 2021/0073211 | A1* | 3/2021 | Wright, Sr. | G06F 16/2379 |
| 2021/0119994 | A1* | 4/2021 | Shekh-Yusef | G06F 16/245 |
| 2021/0357891 | A1* | 11/2021 | Kore | G06F 21/10 |
| 2022/0223242 | A1* | 7/2022 | McFarlane | G06Q 20/3829 |

OTHER PUBLICATIONS

Satoshi Nakamoto, "Bitcoin: A Peer-to-Peer Electronic Cash System," http://bitcoin.org/bitcoin.pdf, 2008, 9 pages.

J. Frankenfield, Investopedia, "Blockchain-as-a-Service (BaaS)," https://www.investopedia.com/terms/b/blockchainasaservice-baas.asp, May 17, 2018, 8 pages.

L. Fortney, Investopedia, "Blockchain Explained," https://www.investopedia.com/terms/b/blockchain.asp, Nov. 26, 2019, 23 pages.

Wikipedia, "Blockchain," https://en.wikipedia.org/wiki/Blockchain, Jan. 23, 2020, 19 pages.

U.S. Appl. No. 16/783,679 filed in the name of Shibi Panikkar et al. filed Feb. 6, 2020, and entitled "Vendor Software Using Distributed Ledger.".

* cited by examiner

```
{
    "Order":{
        "OrderNumber":17465789,
        "System":"VxRail E560F - Entry Level",
        "FactoryID":"FoxConn",
        "DeviceIdentification":{
            "ServiceTag":"<<F>>",
            "PSNT":"<<F>>",
            "SerialNumber":"<<F>>",
            "MBPPID":"<<F>>",
            "HardDiskSerialNumber":"<<F>>",
            "SecretCode":"SecretCode = <<FF>>"
        },
        "Licenses":[{
            "ProductType":"System",
            "Product":"VxRail E560F",
            "LicenseKeyRequired": true,
            "LicenseKeyType":"Generator",
            "LicenseOwner":"Dell",
            "Type":"Served",
            "Activation":"Factory",
            "LicenseVariables":"Users:15,Node:8,ServiceTag:<<F>>,PSNT:<<F>>",
            "PartnerDependency":"Factory"
        },
        {
            "ProductType":"Software",
            "Product":"Power Protect",
            "LicenseKeyRequired": true,
            "LicenseKeyType":"Generator",
            "LicenseOwner":"Dell",
            "Type":"Served",
            "Activation":"Customer",
            "LicenseVariables":"ServiceTag:<<F>>,PSNT:<<F>>",
            "SecretCode":"SecretCode = <<FF>>"
        },
        {
            "ProductType":"Software",
            "Product":"VmWare Cloud Foundation",
            "LicenseKeyRequired": true,
            "LicenseKeyType":"External",
            "LicenseOwner":"VmWare",
            "Type":"NodeBased",
            "Activation":"InProduct",
            "LicenseVariables":"PSNT:<<O>>, ServiceTag:<<O>>, StaticIP:<<C>>, PAC:K694-4D459-45H54-GF87"
        }]
    }
}
```

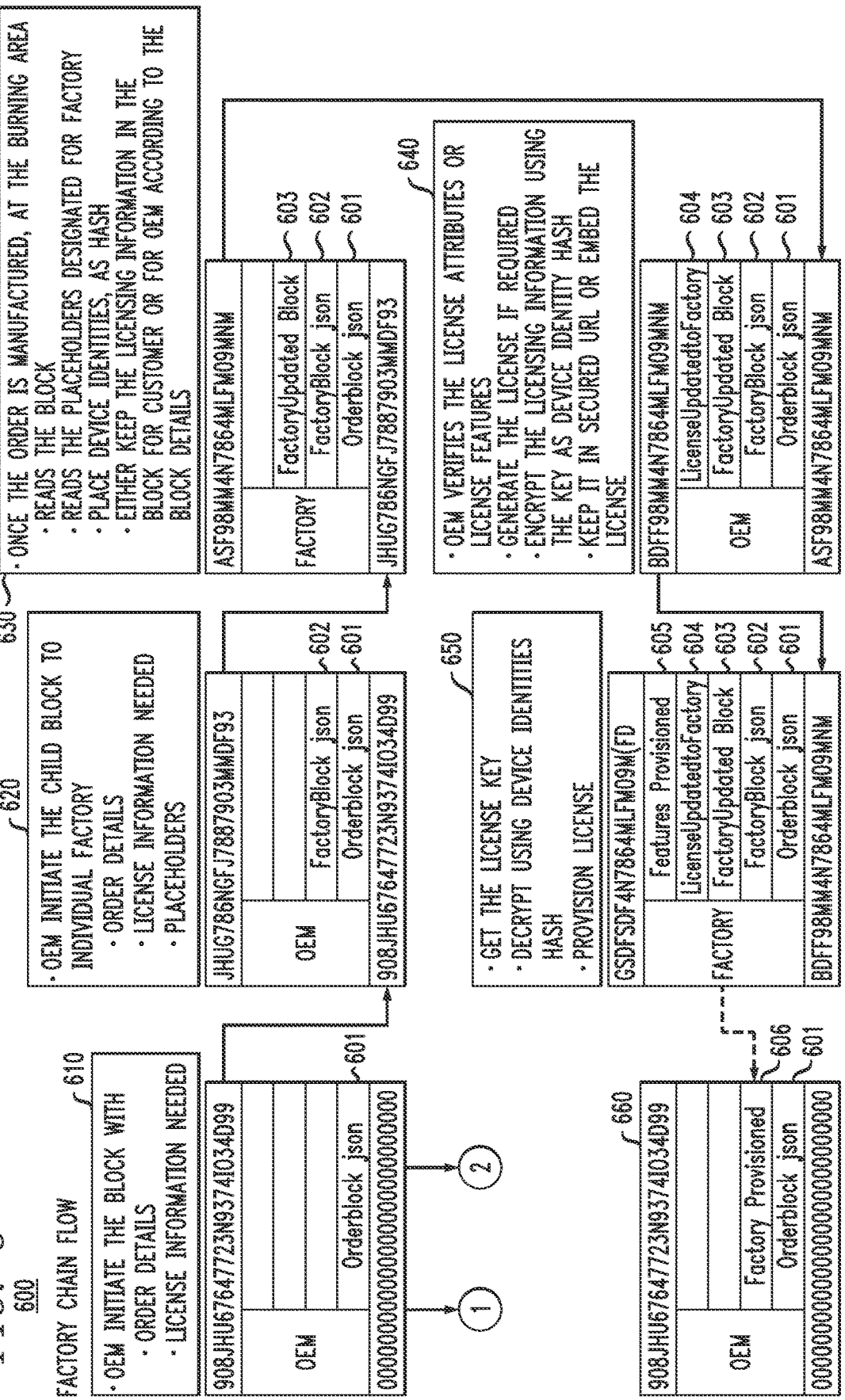

*FIG. 7*

```
{
    "Order":{
        "OrderNumber":17465789,
        "System":"VxRail E560F - Entry Level",
        "FactoryID":"FoxConn",
        "DeviceIdentification":{
            "ServiceTag":"<<F>>",
            "PSNT":"<<F>>",
            "SerialNumber":"<<F>>",
            "MBPPID":"<<F>>",
            "HardDiskSerialNumber":"<<F>>",
            "SecretCode":"SecretCode = <<FF>>"
        },
        "Licenses":[{
            "ProductType":"System",
            "Product":"VxRail E560F",
            "LicenseKeyRequired": true,
            "LicenseKeyType":"Generator",
            "LicenseOwner":"Dell",
            "Type":"Served",
            "Activation":"Factory",
            "LicenseVariables":"Users:15,Node:8,ServiceTag:<<F>>,PSNT:<<F>>",
        },
        {
            "ProductType":"Software",
            "Product":"Power Protect",
            "LicenseKeyRequired": true,
            "LicenseKeyType":"Generator",
            "LicenseOwner":"Dell",
            "Type":"Served",
            "Activation":"Customer",
            "LicenseVariables":"ServiceTag"<<F>>,PSNT:<<F>>",
        }
        ]
    }
}
```

FIG. 8

```
"DeviceIdentification":{
    "ServiceTag":"<<F>>",
    "PSNT":"<<F>>",
    "SerialNumber":"<<F>>",
    "MBPPID":"<<F>>",
    "HardDiskSerialNumber":"<<F>>",
    "SecretCode":"SecretCode = <<FF>>"
},
```

FIG. 9

```
"DeviceIdentification":{
    "ServiceTag":"XU5687",
    "PSNT":"87456345",
    "SerialNumber":"PSU098678",
    "MBPPID":"SJ05609876",
    "HardDiskSerialNumber":"D955L5SSF99090M9",
    "SecretCode":"SecretCode = I1N1cnZpY2VUYWciOiJYVTU2ODciLAogICA
gICAgICAgICAiUFNOVCI6Ijg3NDU2MzQ1IiwKICAgICAgICAgICAgI1N1cm1hbE5tYmVyIjoiU
FNVMDk4Njc4IiwKICAgICAgICAgIk1CUFBJRCI6I1NKTzU2Tzk4NzYiLAogICAgICAgICA
gICAiSGFyZERpc2tTZXJpYWxOdW1iZXIiOiJEOTU1TDVTU0Y5OTA5ME05Iiw="
```

*FIG. 10*

```
"Licenses":[{
            "ProductType":"System",
            "Product":"VxRail E560F",
            "LicenseKeyRequired": true,
            "LicenseKeyType":"Generator",
            "LicenseOwner":"Dell",
            "Type":"Served",
            "Activation":"Customer,
            "LicenseVariables":"Users:15,Node:8,ServiceTag:XU5687,PSNT:87456345"
        },
        {
            "ProductType":"Software",
            "Product":"Power Protect",
            "LicenseKeyRequired": true,
            "LicenseKeyType":"Generator",
            "LicenseOwner":"Dell",
            "Type":"Served",
            "Activation":"Customer",
            "LicenseVariables":"ServiceTag:XU5687,PSNT:87456345",
        }]
```

*FIG. 11*

```
"ProductType":"System", (If Hardware or Software)
"Product":"VxRail E560F", (Name of the Product)
"LicenseKeyRequired": true, (Needs a License to unlock)
"LicenseKeyType":"Generator", (Dell owns the license generation)
"LicenseOwner":"Dell", (Dell)
"Type":"Served", (One License can drive more than one appliance)
"Activation":"Customer", (will be activate at customer location)
"LicenseVariables":"Users:15,Node:8,ServiceTag:XU5687,PSNT:87456345" (These
parameters will be used by the license agent at customer site location to
unlock the feature)
```

VENDOR CHAIN FLOW

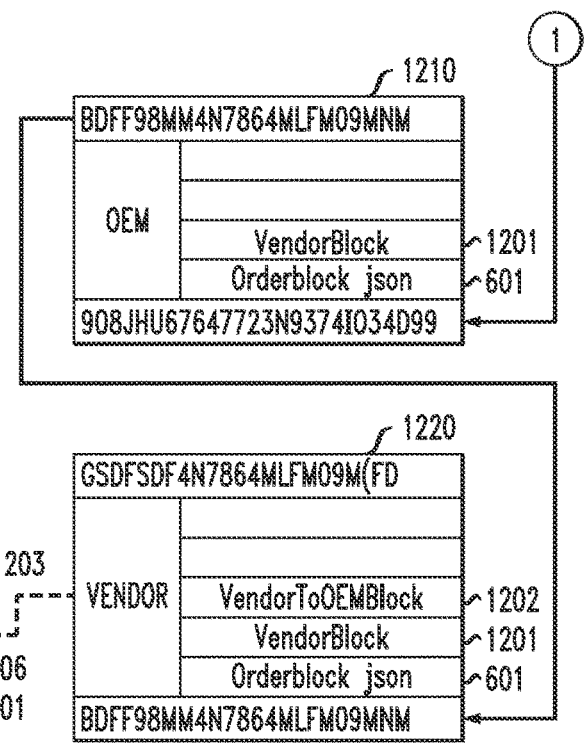

FIG. 13

```
"Licenses":[{
        "ProductType":"Software",
        "Product":"VmWare Cloud Foundation",
        "LicenseKeyRequired": true,
        "LicenseKeyType":"External",
        "LicenseOwner":"VmWare",
        "Type":"NodeBased",
        "Activation":"InProduct",
        "LicenseVariables":"PSNT:87456345, ServiceTag:XU5687, PAC:
K694-4D459-45H54-GF87",
        "LicenseURL":"<<V>>",
        "EmbeddedLicense":"<<V>>"
    }]
```
1300

FIG. 14

```
"LicenseURL":"https://vmware.licensing/LicenseK694-4D459-45H54-GF87",
"EmbeddedLicense":"DF8GH-KDHF9-03NVK-NSD0E-9SD9L"
```
1400

1500
CUSTOMER CHAIN FLOW

*FIG. 16*

```
"Order":{
    "OrderNumber":17465789,
    "DeviceIdentification":{
        "ServiceTag":"<<C>>",
        "PSNT":"<<C>>",
        "SerialNumber":"<<C>>",
        "MBPPID":"<<C>>",
        "HardDiskSerialNumber":"<<C>>",
    }
    "EncryptedLicenseInfo" : ewogICAgIk9yZGVyIjp7CiAgICAgICAgIk9yZGVyTn
VtYmVyIjoxNzQ2NTc4OSwKICAgICAgICAiTGljZW5zZXMiOlt7CiAgICAgICAgICAgICJQcm9k
dWRjdFR5cGUiOiJTeXN0ZW0iLAogICAgICAgICAgICAiUHJvZG1dCI6IlZ4UmFpbCBFNTYwRi
IsCiAgICAgICAgICAgICJMaWNlc2VLZXlSZXF1cm1sZCI6IHRydWUsCiAgICAgICAgICAgICJM
aWNlbnNlS2V5VHlwZSI6IkdlbmVyYXRvciIsCiAgICAgICAgICAgICJMaWNlbnNlT3duZXIiOi
JEZWxsIiwKICAgICAgICAgICAgIlR5cGUiOiJTZXJ2ZWQiLAogICAgICAgICAgICAiQWN0aXZh
dGlvbiI6IkZhY3RvcnkiLAogICAgICAgICAgICAiTGljZW5zZVZhcmlhYmxlcyI6IlVzZXJzOj
E1LE5vZGU6OCxTZXJ2aWNlVGFnOlhVNTY4NyxQU05Uojg3NDU2MzQ1IgogICAgICAgIH0sCiAg
ICAgICAgewogICAgICAgICAgICAiUHJvZHVkY3RUeXBlIjoiU29mdHdhcmUiLAogICAgICAgIC
AgICAiUHJvZG1dCI6IlBvd2VyIFByb3RlY3QiLAogICAgICAgICAgICAiTGljZXNlS2V5UmVx
dXJpZWQiOiB0cnVlLAogICAgICAgICAgICAiTGljZW5zZUtleVR5cGUiOiJHZW5lcmF0b3IiLA
ogICAgICAgICAgICAiTGljZW5zZU93bmVyIjoiRGVsbCIsCiAgICAgICAgICAgICJUeXBlIjoi
U2VydmVkIiwKICAgICAgICAgICAgIkFjdGl2YXRpb24iOiJDdXN0b21lciIsCiAgICAgICAgIC
AgICJMaWNlbnNlVmFyaWFibGVzIjoiU2VydmljZVRhZzpYVTU2ODcsUFNOVDo4NzQ1NjMONSIK
ICAgICAgICB9LAogICAgICAgIHsKICAgICAgICAgICAgIlByb2R1Y3RUeXBlIjoiTnNvZnR3YX
JlIiwKICAgICAgICAgICAgIlByb2RjdXQiOiJWbVdhcmUgQ2xvdWQgRm91bmRhdGlvbiIsCiAg
ICAgICAgICAgICJMaWNlc2VLZXlSZXF1cm1sZCI6IHRydWUsCiAgICAgICAgICAgICJMaWNlbn
NlS2V5VHlwZSI6IkV4dGVybmFsIiwKICAgICAgICAgICAgIkxpY2Vuc2VPd25lciI6IlZtV2Fy
ZSIsCiAgICAgICAgICAgICJUeXBlIjoiTm9kZUJhc2VkIiwKICAgICAgICAgICAgIkFjdGl2YX
Rpb24iOiJJbEByb2R1Y3QiLAogICAgICAgICAgICAiTGljZW5zZVZhcmlhYmxlcyI6IlBTTlQ6
ODcONTYzNDUsIFNlcnZpY2VUYWc6WFU1Njg3LCBTdGF0aWNJUDo8PEM+PiwgUEFDOks2OTQtNE
QONTktNDVINTQtROY4NyIsICAgICAgICAgICAgICAgICAgICAgICAgICAKICAgICAgICAgICAg
IkxpY2Vuc2VVUkwiOiJodHRwczovL3d2FyZS5saWVjZW5zaW5nLXxpY2Vuc2VLNjkOLTREND
U5LTQ1SDU0LUdGODciLAogICAgICAgICAgICAiRW5iZWRkZWRMaWNlbnNlIjoiREY4RDgtSORI
RjktMDNOVkstT1NEMEUtOVNEUwiCiAgICAgICAgfVOKCiAgICAgICAgfQogICAgfQ==
}
```

*FIG. 17*

```
                                                                  ┌─1700
"Licenses":[{
            "ProductType":"System",
            "Product":"VxRail E560F",
            "LicenseKeyRequired": true,
            "LicenseKeyType":"Generator",
            "LicenseOwner":"Dell",
            "Type":"Served",
            "Activation":"Factory",
            "LicenseVariables":"Users:15,Node:8,ServiceTag:XU5687,PSNT:874
56345"
        },
        {
            "ProductType":"Software",
            "Product":"Power Protect",
            "LicenseKeyRequired": true,
            "LicenseKeyType":"Generator",
            "LicenseOwner":"Dell",
            "Type":"Served",
            "Activation":"Customer",
            "LicenseVariables":"ServiceTag:XU5687,PSNT:87456345"
        },
        {
            "ProductType":"Software",
            "Product":"VmWare Cloud Foundation",
            "LicenseKeyRequired": true,
            "LicenseKeyType":"External",
            "LicenseOwner":"VmWare",
            "Type":"NodeBased",
            "Activation":"InProduct",
            "LicenseVariables":"PSNT:87456345, ServiceTag:XU5687, StaticIP
:<<C>>, PAC:K694-4D459-45H54-GF87",
            "LicenseURL":"https://vmware.licensing/LicenseK694-4D459-
45H54-GF87",
            "EmbeddedLicense":"DF8GH-KDHF9-03NVK-NSD0E-9SD9L"
```

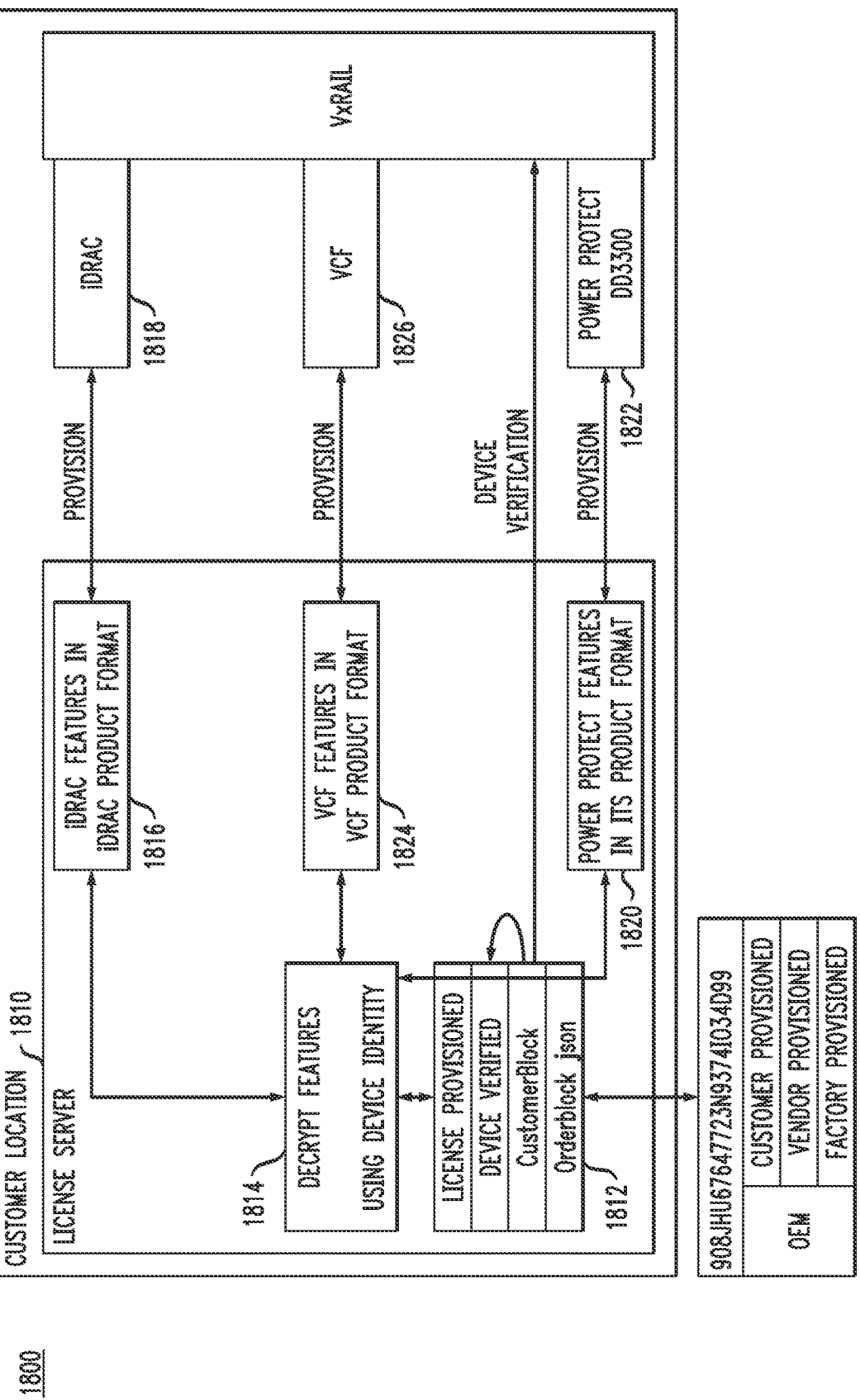

SYSTEM FUNCTIONALITY ACTIVATION USING DISTRIBUTED LEDGER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to techniques for managing activation of functionalities in information processing systems.

BACKGROUND

Activation or license key generation and enforcement (i.e., to ensure that a customer only uses the functionalities that are purchased) are significant challenges in the hardware and software systems industries. Most hardware is controlled by software installed on top of the hardware, e.g., functionalities of the hardware that a given customer can use are determined by the software. The software determines which functionalities the given customer can use from the license key installed in the hardware. For example, in the case of an original equipment manufacturer (OEM) that sells a computer system that has third party software installed for use on the computer system (such as, but not limited to, an operating system), the OEM typically purchases a license key from the third party software provider that is fused in (permanently associated with) the computer system before it is sold to an OEM customer. The license key, which typically is a data string, is used by the third party software provider to verify authorized use of the software by the customer of the OEM before activating the software. For an OEM that delivers a large number of systems, the management of a large number of license keys presents significant challenges.

By way of further example, consider the situation with regard to recurring customer usage of a system that receives upgrades from the OEM. For each and every upgrade of the system purchased from the OEM by the customer, a new license key typically must be generated or otherwise obtained and sent to the customer to unlock the functionalities of the upgraded system. This makes the process time consuming and non-customer friendly.

SUMMARY

Embodiments of the invention provide improved techniques for managing activation of functionalities in an information processing system.

For example, in one illustrative embodiment, a method generates, at a first node in a distributed ledger network, at least one data object comprising data associated with a system and one or more unactivated functionalities of the system, and the data object further comprising one or more parameter fields configured for one or more other nodes in the distributed ledger network to subsequently insert data therein. The method obtains the at least one data object after data is inserted in the one or more parameter fields by the one or more other nodes. The method sends the at least one object to an additional node in the distributed ledger network for use in activating the one or more unactivated functionalities of the system.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments eliminate different license generators for different software/hardware with different versions and avoid the overhead of managing different versions of the same for OEMs. Also, the need for obtaining and managing license keys from vendors or redirecting customers to vendors to get the keys is eliminated. Still further, illustrative embodiments ensure that what the customer purchased is what they are getting with original components.

These and other illustrative embodiments include, without limitation, apparatus, systems, methods and computer program products comprising processor-readable storage media.

BRIEF DESCRIPTION OF THE DRAWINGS

FIG. 5 illustrates a master block according to an illustrative embodiment.

FIG. 6 illustrates a factory partner chain flow according to an illustrative embodiment.

FIGS. 7-11 illustrate blocks used in a factory partner chain flow according to an illustrative embodiment.

FIG. 12 illustrates a vendor partner chain flow according to an illustrative embodiment.

FIGS. 13 and 14 illustrate blocks used in a vendor partner chain flow according to an illustrative embodiment.

FIGS. 16 and 17 illustrate blocks used in a customer partner chain flow according to an illustrative embodiment.

FIG. 18 illustrates a license server according to an illustrative embodiment.

DETAILED DESCRIPTION

Figure 1:
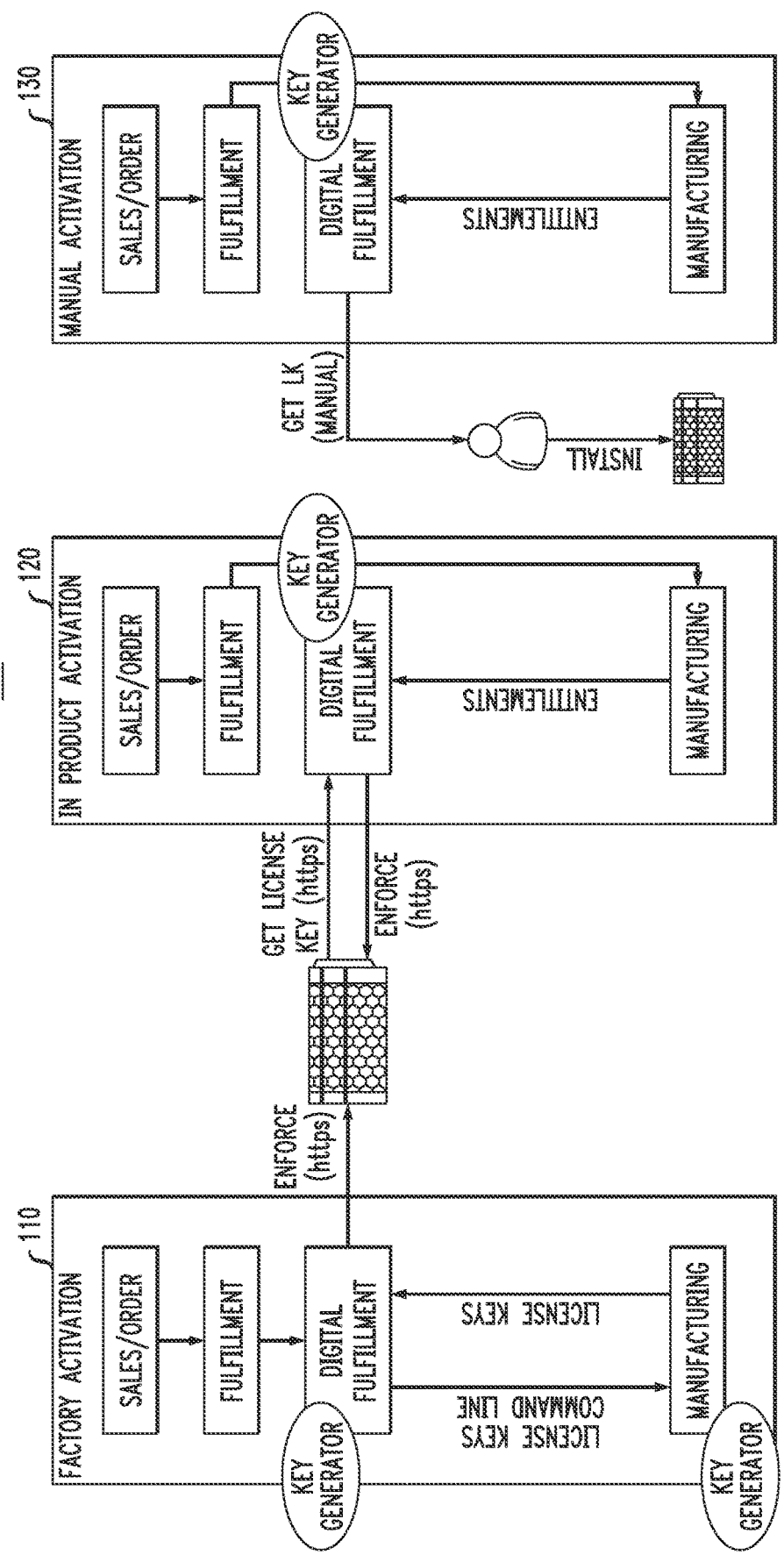
FIG. 1 illustrates license use cases with which illustrative embodiments can be implemented.

Illustrative embodiments will be described herein with reference to exemplary information processing systems and associated host devices, storage devices and other processing devices. It is to be appreciated, however, that embodiments are not necessarily restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments.

Furthermore, some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or a computing system. On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid cloud computing environment). A computing environment that comprises multiple cloud platforms (private clouds, public clouds, or a combination thereof) is referred to as a "multi-cloud computing environment."

Moreover, phrases "computing environment," "cloud environment," "cloud computing platform," "cloud infrastructure," "data repository," "data center," "data processing system," "computing system," "data storage system," "information processing system," and the like as used herein are intended to be broadly construed, so as to encompass, for example, any arrangement of one or more processing devices.

Functionality activation through licensing and enforcement are important functions of the OEM. In current practice, the OEM needs to maintain license key generators (e.g., a software module, executable file, application, or the like, configured to generate a license key) for all products they manufacture with different versions of the same. Most often, a system ships to the customer with a full set of locked (un-activated) system functionalities and a license key given to the customer unlocks (activates) at least a subset of the system functionalities which the customer purchased. Also, the OEM may manage licenses from third-party vendors, when there is other software from third-party vendors that is part of the system (e.g., operating system software and/or application program software). License key management is increasingly important as information technology (IT) infrastructure moves more predominantly to a service or subscription model.

By way of example only, consider as a system, the Dell Technologies Cloud Platform (DTCP) system, which integrates VMware Cloud Foundation (VCF) software on a Dell Technologies VxRail hardware infrastructure. DTCP is the first hyperconverged infrastructure system fully integrated with a VCF software-defined data center (SDDC) manager delivering simplified operations through automated lifecycle management, thus enabling access to a hybrid cloud using a single platform to develop, test, and execute cloud native applications alongside traditional applications. The DTCP with VxRail and VCF is offered as a subscription. In terms of OEM and a third-party vendor, in this example, Dell Technologies is the OEM, while VMware is the third-party vendor. The customer is the individual or company that subscribes to the DTCP system (e.g., enters into a service or subscription agreement with Dell Technologies).

In this non-limiting example, a VxRail license is needed which controls users/seats, as well as the customer subscription agreement term (e.g., how long does the customer have certain functionalities activated for use). Note that a per seat license is based on the number of individual users who have access to a system, e.g., a per seat license for 25 users defines that a maximum of 25 users can access the system. Further, a VCF license is made available from VMware. Accordingly, for each expansion and renewal of the customer subscription agreement for DTCP, Dell Technologies and VMware need to generate new license keys and download them to the customer site (e.g., where the licensed system is operating) and install the licenses. Also, in this example, Dell Technologies as the OEM typically also needs to, for the sake of device security, initiate a "call home" operation using an agent module deployed on the customer system to verify components installed in the VxRail platform.

The above-mentioned and other current license generation and enforcement mechanisms are time consuming and have difficulty maintaining security, especially when keys are transferred between OEMs, vendors and/or other entities. Further, an OEM has to maintain multiple license key generators for a given licensed system, i.e., different versions for the same system for different customers, who use different versions of the systems. The OEM also needs to communicate with vendors to obtain the license or redirect the customer to a web site of the vendor to obtain the license. Still further, in a subscription model, license management becomes even more complicated as customers can sometimes expand, renew or cancel their subscription at a point in time. As such, the corresponding license needs to be regenerated or otherwise obtained from a vendor and pushed to the system to implement usage enforcement. License keys need to be securely stored and transported since a breach in the communication channel can lead to significant loss to the OEM. Yet further, when the system ships, current licensing solutions do not adequately check if the components installed in the system are original components.

At the time of shipment of a system to a customer, there are currently several different licensing use cases. Three main illustrative use cases are depicted in example 100 of FIG. 1.

In a factory activation use case 110, the OEM controls the sales/order, fulfillment and digital fulfillment aspects of the process. However, a license key generator is provided to an entity that actually builds the system for the OEM, sometimes referred to as an original design manufacturer (ODM) or manufacturer (factory). The ODM generates a license key and provides it to the OEM before the system is shipped to customer.

In a product activation use case 120, an entitlement for the system is created at the OEM based on functionalities purchased by the customer. After the system is shipped to the customer, and booted for the first time, the system automatically makes a "call home" to OEM to obtain the license key.

In a manual activation use case 130, once the system is shipped, the customer accesses an OEM web application and downloads the license key.

In each of the above use cases, the OEM needs to manage the license generator (typically in the form of one or more executable (.exe) files, an application, or some other form of a software module) with different versions, as well as manage vendor license keys. This leads to significant overhead for the OEM and, ultimately, adversely impacts the customer experience. Also, transfers of keys and other information between partners in the licensing and enforcement process pose security risks.

Thus, with exemplary reference to the DTCP system mentioned above, assume the customer purchases the VxRail system with VCF software for setting up their cloud environment. In this functionality-activation situation, part of the VxRail system is factory activated while other parts are manually activated, and the VCF software is product activated. More particularly, the existing functionality-activation process may comprise:

1. Customer places order for a system (e.g., device, product, etc.).
2. Dell (OEM) generates the license key attributes (system functionalities to be activated) with a specific license generator (drawback: overhead of maintaining different licensing tools and versions).
3. Order passes to the factory (ODM that builds the system for the OEM) along with attributes (drawback: more overhead).
4. Factory also maintains a license key generator associated with an integrated Dell remote access controller or iDrac (drawback: potential security issue).
5. Factory uses the generator to generate a license key using the attributes and a service tag (drawback: another potential security issue).
6. Factory ships material to a merge center to add additional hardware (drawback: chance of device compromise since an installed component can be changed).
7. Customer accesses Dell portal to download the license keys and activate the same (drawback: extra effort for customer and overhead for OEM).
8. Customer redirects to VMware (third-party vendor) site to obtain the VCF license based on a partner activation code (PAC) code issued by Dell (drawback: extra overhead for OEM and vendor).
9. System itself or a license server at the customer site calls Dell ("call home") with the service tag to confirm the originality of the components installed (drawback: extra overhead for OEM).
10. System or license server unlocks features (functionalities) according to the license keys.

Illustrative embodiments overcome the above and other drawbacks by providing, inter alia, a generic license generation approach for software and/or hardware systems from different sources (e.g., OEMs, vendors, etc.). The generic license that is generated is in a standardized or common format such that any license enforcement mechanism can universally read and apply. The generic license generation approach eliminates the need to create multiple license generators for different software/hardware with different versions and avoids the overhead of managing different versions of the same for OEMs. Further, the generic license generation approach eliminates the need for managing license keys from vendors and avoids redirection of customers to vendor web sites to obtain the license keys. Still further, the generic license generation approach ensures system security by making sure that the customer-purchased system includes all original components.

In one or more illustrative embodiments, the above and other advantages are achieved by a distributed license file methodology. The methodology, in at least some illustrative embodiments, employs a distributed ledger using, for example, a customized blockchain with encryption/hash technology. More particularly, in at least one illustrative embodiment as will be further explained in detail below in the context of the figures, a generic license file with purchase order information is generated by the OEM for the order with one or more OEM products represented in a master block in a distributed ledger/blockchain with placeholder blocks for third-party vendors products and/or manufacturers/factories/ODMs (collectively, partners). The blocks are distributed to the partners via secure communication channels, who then update the placeholder blocks using blockchain technology and encryption logic keys as system variables. When, at the customer location, a license server reads the block from the blockchain, this block represents a comprehensive license file which includes all information needed for license activation and enforcement. Further, the license server and/or some other entity at the customer location, such as one or more license enforcers which will be further described below, open the comprehensive license file using the system specific encryption key and run the license file to unlock (activate) only the purchased features (functionalities) of the system.

The illustrative scenario below refers to a similar example as above where OEM equipment is from Dell Technologies Inc. (e.g., VxRail, Power Protect, etc.) and vendor software from VMware Inc. (e.g., VCF, etc.) However, it is to be appreciated that these are only examples and embodiments are not limited to any such hardware or software products.

Assume that a customer placed an order as follows: VxRail (5 users, 8 compute nodes); Power Protect (that should work only with the purchased VxRail); and VCF (VMware product).

In this scenario, the customer needs two license key generators (one for VxRail and one for Power Protect), and needs to obtain a license from VMware (VCF). The two license generators can be described as follows:

(i) VxRail License Generator with input parameters:
  a. Number of Users (License key allows X number of users);
  b. Number of Nodes (License key allows X number of nodes); and
  c. Service Tag (Machine Identifier).

The license generator generates a key for the VxRail product. A license enforcer in the machine (in the VxRail product) reads this license key and unlocks functionalities for five users and eight compute nodes.

(ii) Power Protect License Generator with input parameters:
  a. Tera Bytes (Size of back-up allowed); and
  b. Service Tag (Power Protect should work only in this VxRail machine).

The license generator generates a key for the Power Protect product. A license enforcer in the machine reads this license key and checks if the machine service tag is the same in the key and allows X tera bytes size of the back-up.

A VCF license file is obtained separately from VMware.

Figure 2:
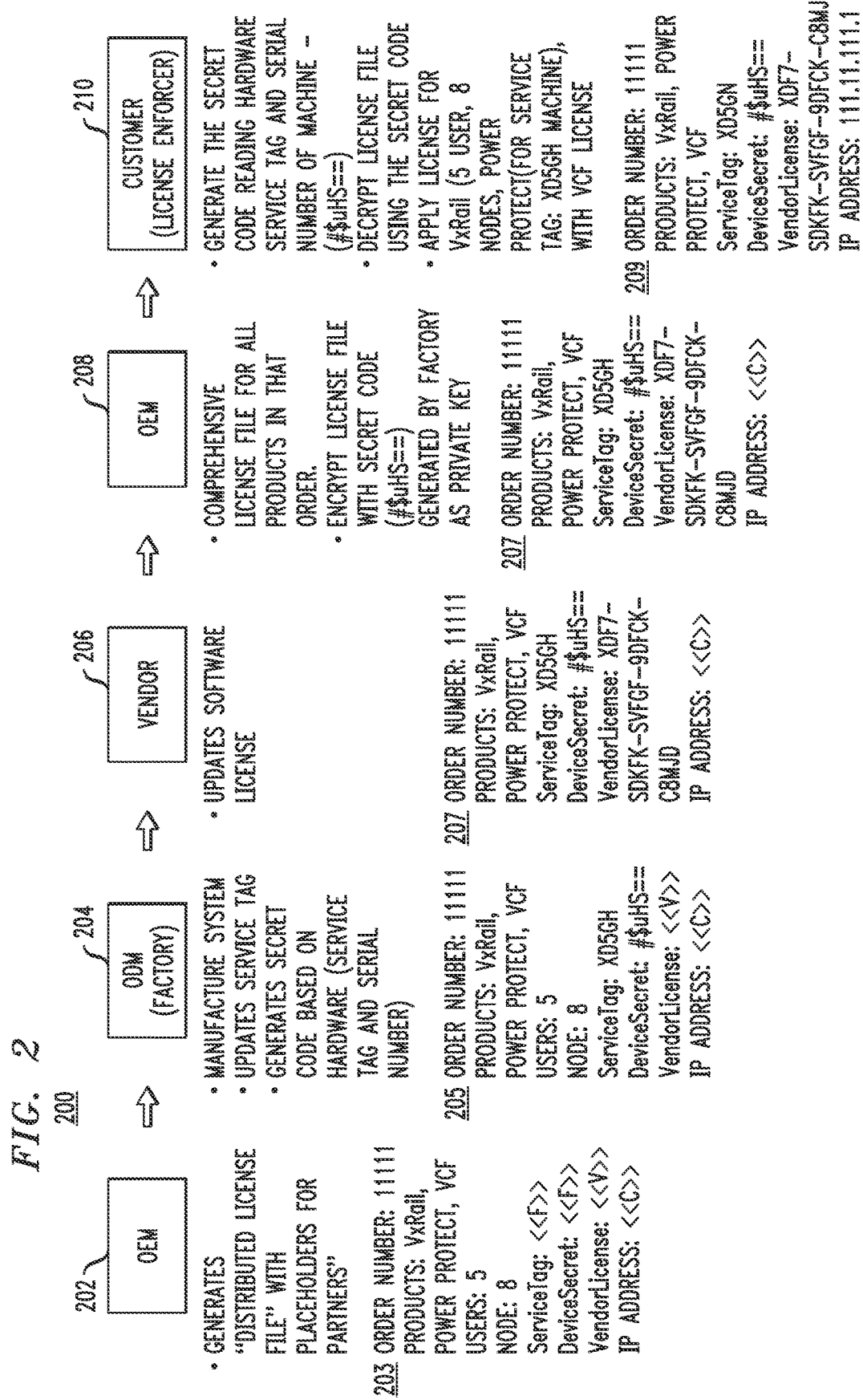
FIG. 2 illustrates an end-to-end distributed license file flow according to an illustrative embodiment.

FIG. 2 illustrates an example of an end-to-end workflow 200 with respect to such license generators and license enforcers in the above-mentioned VxRail/Power Protect/VCF system purchase scenario.

In step 202, the OEM generates a generic license file with placeholders for partners as explained above. An example of such a generic license file is a distributed license file 203 shown in FIG. 2. In addition to the order number and system information (e.g., products, number of authorized users, number of authorized nodes in the order) provided by the OEM, distributed license file 203 also includes four placeholders (the symbol << >> represents the placeholder in which the data provided by one of the participants will be added during the workflow 200):

(i) two placeholders for the ODM or factory (F) including Service Tag: <<F>> and Device Secret: <<F>> (note that the device secret here can more generally be referred to as the system secret, i.e., the system being purchased by the customer);

(ii) one placeholder for the vendor (V) denoted as VendorLicense: <<V>>; and (iii) one placeholder for the customer (C) denoted as IP Address: <<C>>.

The information that will be added to these placeholders will be explained below in further steps of workflow 200. It is to be appreciated that in an illustrative blockchain embodiment, the order number and system information can be part of one block, while each placeholder can be part of its own separate block.

In step 204, the distributed license file 203 is obtained by the ODM (factory) manufacturing the system for the OEM. The ODM manufactures the system and updates the distributed license file by adding a service tag in the placeholder labeled Service Tag: <<F>>. The service tag, in some illustrative embodiments, is a unique system identification alphanumeric value given by the OEM and communicated to or otherwise known by the ODM, that is inserted into the distributed license file by the ODM. The ODM also generates a secret code and adds it to the distributed license file in the placeholder labeled Device Secret: <<F>>. In some illustrative embodiments, the secret code (i.e., a private value) comprises a combination of unique identifiers including the service tag and a serial number of the system (and/or a part identifier (PPID) of the motherboard in the system). However, other private values (e.g., private cryptographic keys) can be used for encrypting the file. The updated distributed license file is denoted as 205.

In step 206, the updated distributed license file 205 is obtained by the vendor (e.g., VMware in scenario above). The vendor updates the placeholder labeled VendorLicense: <<V>> with the unique license number for the specific vendor-provided product that is part of the system purchased by the customer. The further updated distributed license file is denoted as 207.

In step 208, the further updated distributed license file 207 is obtained by the OEM. The further updated distributed license file 207 may be referred to as a comprehensive distributed license file 207 since it comprises identifying and licensing information associated with all the products in the system order. The comprehensive license file 207 is encrypted using the secret code generated by the ODM in step 204. Use of a private value (cryptographic key), such as the secret code, to encrypt a file is known to those of ordinary skill in the symmetric cryptography art and thus is not described in further detail herein.

In step 210, when the customer receives the purchased system and obtains the comprehensive distributed license file 207, the customer generates the secret code by reading the service tag and serial number (used to create the secret code at the ODM in step 204) directly from the system it received. The customer decrypts the comprehensive distributed license file 207 using the secret code. Use of a private value (cryptographic key), such as the secret code, to decrypt a file is known to those of ordinary skill in the symmetric cryptography art and thus is not described in further detail herein. In symmetric cryptography, the same cryptographic key is used to encrypt data and then decrypt the data. Other forms of cryptography (and, more generally, data secrecy) other than symmetric cryptography can be used in accordance with alternative embodiments.

It is to be appreciated that the information in the decrypted file serves to inform the customer which functions are to be enabled for the system once the distributed license file is applied. The information in the file is unreadable by any entity that does not have or cannot itself regenerate the secret code. The customer then, as a further part of step 210, adds an Internet Protocol (IP) address of a license enforcement agent in the placeholder labeled IP Address: <<C>>, and causes the customer-updated comprehensive distributed license file 209 (considered a final comprehensive license key) to be submitted to the license enforcement agent (e.g., in customer-based license server and/or in separate license enforcer nodes) to activate the purchased functionalities of the products in the received system (e.g., VxRails, Power Protect, VCF, etc. in the above exemplary scenario).

Details of how each participant in workflow 200 obtains and adds to the distributed license file in each step of the process will be further explained below in the context of a distributed ledger (e.g., blockchain) implementation. Note that the distributed license file, data that is part of one of more blocks that constitute the distributed license file, and/or the one or more data blocks themselves may otherwise be referred to herein as a "data object" or "data objects."

Illustrative embodiments perform the end-to-end flow 200 in the context of a trusted digital ledger, e.g., blockchain network, as will be explained in further detail below. When using a blockchain network, the OEM benefits by way of example by not needing multiple license generators and maintenance of them, not needing months of licensing team engagement for a new product's license key generator, not needing to pool third-party product licenses or divert the customer to the third-party vendors. Further, the blockchain network provides device security by using a secure distributed license file approach.

Figure 3:
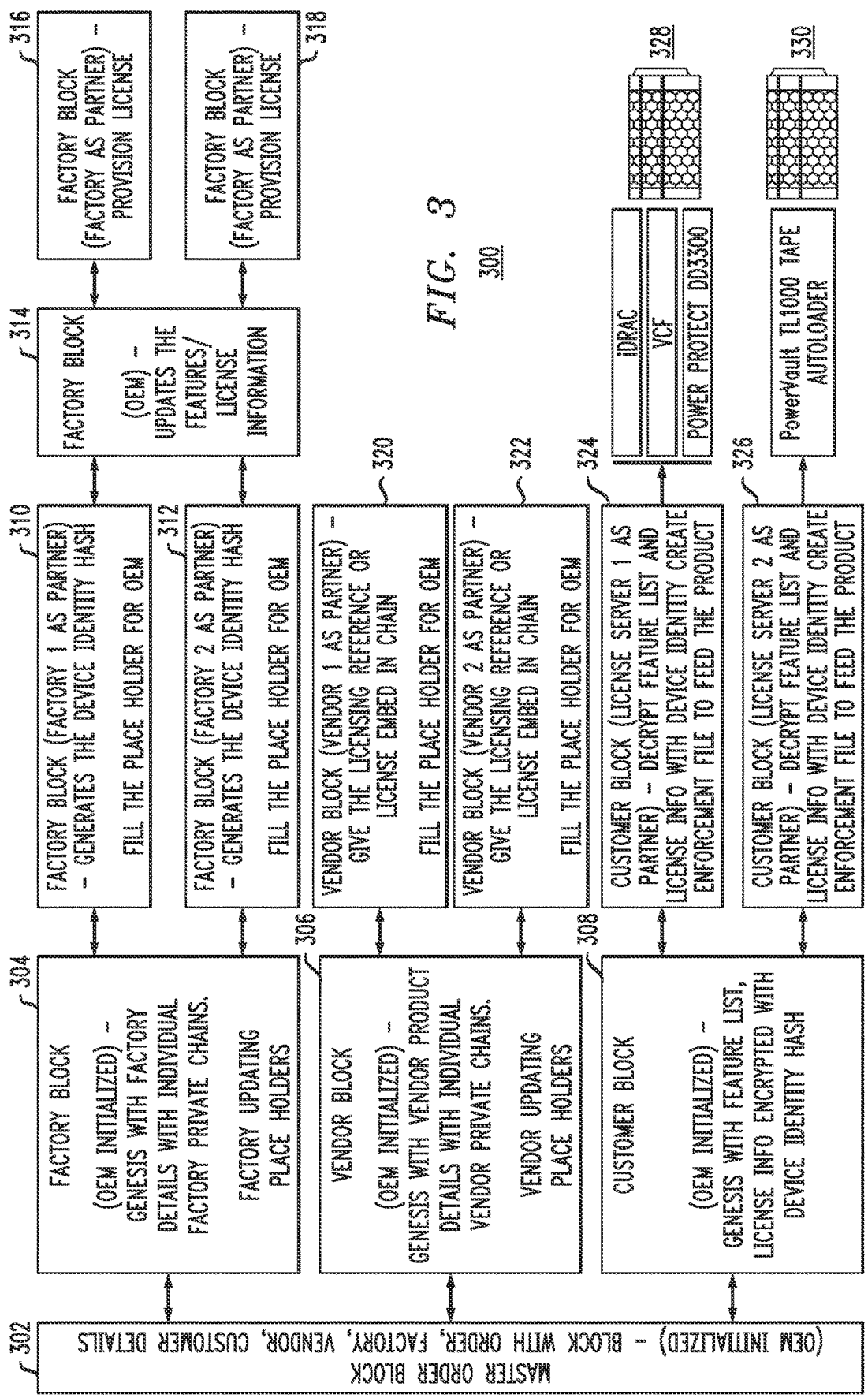
FIG. 3 illustrates a block hierarchy for use in activation and enforcement of licensed functionalities according to an illustrative embodiment.

Exemplary hierarchy of blocks 300 for use in a blockchain network will now be described in the context of FIG. 3. Blockchain network embodiments that use such a block hierarchy, as well as other block implementations, will then be described. As explained above in workflow 200 in FIG. 2, OEM generates a generic license file for all products in a system order with partner placeholders. By way of the example in FIG. 3, as part of the process of generating a generic license file, OEM creates: (i) order block 302 which is the master block pointing to the following initial partner blocks; (ii) initial partner block 304 for Factory (ODM), if manufacturing required; (iii) initial partner block 306 for Vendor, if vendor software licensing is required; and (iv) initial partner block 308 for Customer for final comprehensive license key.

OEM creates the initial partner blocks with the customer purchase information and placeholders for Factory <<F>>, Vendor <<V>> and Customer <<C>> (recall as explained above). The initial partner blocks point to subsequent placeholder blocks and other blocks associated with specific partners in the blockchain network, as shown in FIG. 3.

(i) Factory blocks are blocks that form a private chain for each factory and include manufacturing details. Factory reads (from the blockchain network, as will be further explained herein), master block 302 to obtain the information associated with the order. Once their product is manufactured, each factory adds a new block (block 310 for Factory 1, block 312 for Factory 2, etc.) with the manufacturing details encrypted with a secret code (recall in FIG. 2) formed using component identification numbers (e.g., where OEM needs to verify the device originality such as a motherboard serial number, other different part identification numbers, service tag, etc.). This addresses device security before activating the features at the customer end. OEM can then update the feature information (forming block 314) to be enabled with the contract date (e.g., 4 users, 8 seats for 3 years). If each factory needs to be provisioned (e.g., unlock features), it does so (respective blocks 316 and 318).

(ii) Vendor blocks are blocks that form a private chain for each vendor/vendor product. Vendors read (from the blockchain network, as will be further explained herein) products that need their licenses. Each vendor updates the vendor licensing information in the chain with a unique product identifier (block 320 for Vendor 1, block 322 for Vendor 2, etc.).

(iii) Customer blocks are blocks that form a private chain for each system the customer purchased (block 324 for License Server 1, block 326 for License Server 2, etc.). Each customer-based license server agent reads (from the blockchain network, as will be further explained herein) the installed component and recreates the secret code to decrypt the features to be enabled (and can verify the originality of the devices inside the system). The license server then unlocks the features (e.g., 328 and 330) that the customer purchased. As mentioned above, separate license enforcement modules in communication with the one or more license servers can be used for all or part of the activation/enforcement operations.

In illustrative embodiments, blocks are in a JavaScript Object Notation (JSON) format to enable a common, standardized format for universal reading and writing of data. One or more other data formats may be employed in alternative embodiments.

Figure 4:
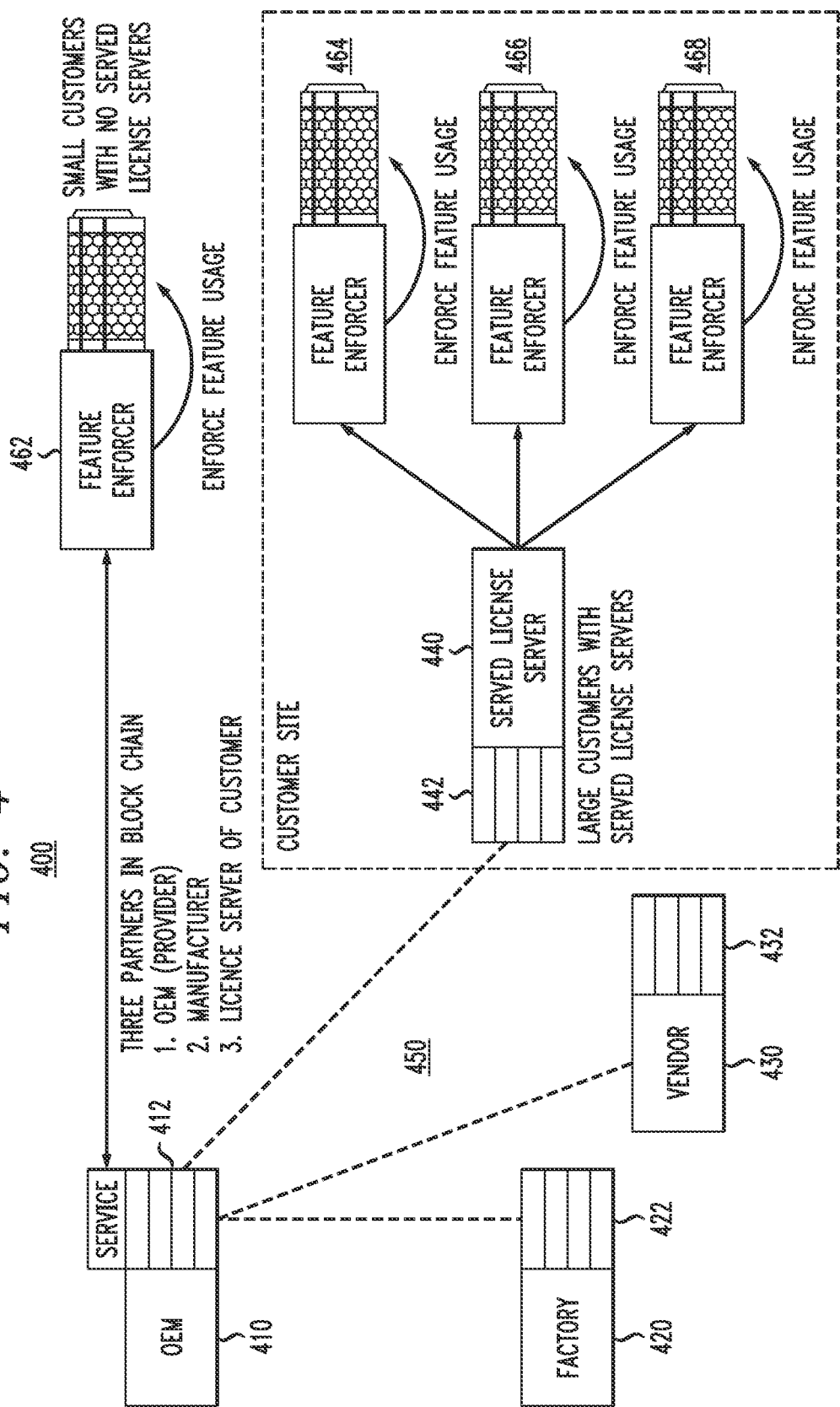
FIG. 4 illustrates a blockchain architecture for use in activation and enforcement of licensed functionalities according to an illustrative embodiment.

Further details of use of a distributed ledger approach in accordance with illustrative embodiments will now be described in the context of an information processing system 400 that implements a blockchain network in FIG. 4. As shown, information processing system 400 comprises OEM network node 410, factory/ODM network node 420, vendor network node 430, and customer (license server) network node 440. Each network node has an accessible instance (copy) of a blockchain (distributed ledger) 450 of transaction data in the form of blocks written to and read from the blockchain 450 by each network node. Thus, OEM network node 410 comprises an accessible blockchain instance 412, factory network node 420 comprises an accessible blockchain instance 422, vendor network node 430 comprises an accessible blockchain instance 432, and customer (license server) network node 440 comprises an accessible blockchain instance 442. As will be explained further below, blocks of transaction data that are added by any network node (410, 420, 430, 440) to its blockchain instance are accessible at the blockchain instance at any other network node. Thus, each blockchain instance (412, 422, 432, 442) of the blockchain 450 is intended to be identical. Also shown in information processing system 400 is a set of feature enforcer nodes 462, 464, 466 and 468, as will be further explained.

As used herein, the terms "distributed ledger," "blockchain" and "digital ledger" may be used interchangeably. A blockchain or distributed ledger protocol is implemented via a distributed, decentralized computer network of computing resources or compute nodes (e.g., OEM network node 410, factory/ODM network node 420, vendor network node 430, and customer (license server) network node 440 each maintain at least one compute node that collectively are part of the distributed ledger 450). The compute nodes are operatively coupled in a peer-to-peer communications protocol. In the computer network, each compute node is configured to maintain a blockchain which is a cryptographically secured record or ledger of data blocks that represent respective transactions within a given computational environment (e.g., transactions are events associated with the manufacture of a computer system and activation of products pre-installed in the computer system). The blockchain is secured through use of a cryptographic hash function. A cryptographic hash function is a cryptographic function which takes an input (or message) and returns a fixed-size alpha numeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data. In existing digital ledger technologies such as blockchain, an underlying consensus algorithm is typically used to validate new transactions before they are added to the digital ledger. Typically, for example, the new transaction entry is broadcast to all or a subset of nodes within the network and inspected. The entry is formally committed to the blockchain when consensus is reached by the recipient nodes that the entry is valid. A key principle of the blockchain is that it is trusted. That is, it is critical to know that data in the blockchain has not been tampered with by any of the compute nodes in the network (or any other node or party). For this reason, a cryptographic hash function is used. Each resulting hash value is unique such that if one item of data in the blockchain is altered, the hash value changes. It is to be appreciated that the above description represents an illustrative implementation of the blockchain protocol and that embodiments are not limited to the above or any particular distributed ledger implementation. As such, other appropriate processes may be used to securely maintain and add to a set of data in accordance with embodiments of the invention. For example, distributed ledgers such as, but not limited to, R3 Corda, Ethereum, Ripple, Quorom, and Hyperledger Fabric may be employed in alternative embodiments.

Turning back to FIG. 4, in one example, factory network node 420 can create a block with details for purchased features (functionalities) that are required for a feature enforcer (e.g., 464) at the customer location to activate once the license key is validated by the customer (license server) network node 440. Factory network node 420 can also generate a unique data string combining all required important components identification numbers and encrypt the features details using the unique string. Then, the customer (license server) network node 440 is responsible for unlocking the features in conjunction with one of the feature enforcers nodes 464, 466, or 468. In one example, one of the feature enforcer nodes (module or mechanism) 464, 466, or 468 can monitor (e.g., actively and/or passively) that only authorized features are being used in the product or system. Note that feature enforcer node 462 can be used when the customer does not have an on-site license server. In such case, a seller agent module can run in a customer server to enforce proper usage of any purchased features. Note that, in some illustrative embodiments, the license server node 440 re-generates the unique string combining components identification numbers and uses it to decrypt and read the features to be unlocked from the factory and OEM blocks.

Referring to FIG. 5, an OEM-initiated master block 500 is shown according to an illustrative embodiment. As shown in the exemplary block 500, recall the DTCP system scenario above wherein the products in the order include VxRails and Power Protect (Dell Technologies as the OEM) and VCF (VMware as a third-party vendor). The ODM can be any manufacturer (factory) capable of fabricating the VxRails systems based on specifications from Dell Technologies, while the customer is any customer of Dell Technologies that orders the DTCP system.

An exemplary factory chain flow 600 is shown in FIG. 6. Note that each step in the flow 600 also illustrates the network node that generates the data along with its corresponding blockchain instance (recall FIG. 4). As mentioned, in some illustrative embodiments, the data in each block is in a JSON format. Each step depicts how data generated at each network node is securely added to the blockchain, and therefore securely accessible to the other network nodes in the blockchain network in subsequent steps.

In step 610, OEM initiates an order (master) block 601 (OrderBlock) with order details and any needed license information and adds block 601 to the blockchain using a hash function as mentioned above in a typical blockchain implementation.

In step 620, OEM further initiates a factory (child) block 602 (FactoryBlock) with one or more factory placeholders as explained above. OEM adds block 602 to the blockchain using a hash function as is typically known. Note how the blockchain maintains the previously added order block 601 along with the newly added factory block 602.

In step 630, once the order is manufactured, the factory reads the factory block 602 from the blockchain and reads the one or more placeholders designated for the factory. The factory creates a factory updated block 603 (FactoryUpdatedBlock) and adds one or more device identities (as a hash) in the factory updated block 603. Block 603 can include licensing information for the customer or OEM, as required by OEM. Block 603 is added to the blockchain using a hash function as is typically known.

In step 640, OEM verifies the license attributes or license features, and generates the license as required. The license can be specified as a secure uniform resource locator (URL) or embedded directly in a block. OEM encrypts the licensing information and needed data from the factory block 603 using the device identities hash received from the factory as a cryptographic key (i.e., secret code, device secret, private cryptographic value, etc.). OEM then creates a factory updated block 604 (FactoryUpdatedBlock) with the encrypted data and adds it to the blockchain using a hash function as is typically known.

When the order requires the factory to provision features in the system, in step 650, the factory reads the factory updated block 604, obtains the license key, decrypts it using the device identities hash, and provisions the license. The factory creates a features provisioned block 605 and adds it to the blockchain using a hash function as is typically known.

In step 660, OEM creates a factory provisioned block 606 (FactoryProvisioned) that contains the data added by the factory and adds block 606 to the blockchain using a hash function as is typically known.

FIG. 7 illustrates a block 700 in JSON file format as an example of factory (child) block 602 (FactoryBlock) created by OEM in step 620. As explained above, the factory reads this block and replaces the appropriate placeholders with values, and creates a secret code. In one embodiment, the secret code can be generated using a Base64 encoding logic with all the device specific identities (unique identifiers). FIG. 8 highlights a portion 800 of block 700 used for such device security. More particularly, once the system is manufactured, the device security portion of block 700 will read as shown in portion 900 of FIG. 9.

Still further, FIG. 10 shows portion 1000 of block 700 illustrating added license information for the VxRails server and the Power Protect product that are part of the order, while FIG. 11 shows portion 1100 of block 700 which is an annotated version of portion 1000 for use by a licensing agent (e.g., license server and/or license enforcer node) to unlock all the purchased functionalities.

An exemplary vendor chain flow 1200 is shown in FIG. 12. Note that each step in the flow 1200 also illustrates the network node that generates the data along with its corresponding blockchain instance. Note also that the flow 1200 references back to step 610 of FIG. 6. More particularly, after OEM creates order block 601 in step 610, OEM further initiates a vendor (child) block 1201 (VendorBlock) in step 1210 with vendor placeholders as explained above. Block 1201 also includes a partner activation code (PAC), as explained above, so that the vendor knows which product is associated with the order. OEM adds block 1201 to the blockchain using a hash function as is typically known. An example of block 1201 is shown in JSON format file 1300 in FIG. 13.

In step 1220, the vendor reads block 1201 and updates vendor placeholders with license information for the product it supplied to the system order. The vendor creates a vendor updated block 1202 (VendorToOEMBlock) and adds it to the blockchain using a hash function as is typically known. An example of block 1202 is shown in JSON format file 1400 in FIG. 14. Note that some vendors will update the LicenseURL placeholder while others will update the EmbeddedLicense placeholder, depending on their licensing practices. The information inserted in the placeholder by the vendor is used by the customer to unlock (activate) the product.

In step 1230, OEM creates a vendor provisioned block 1203 (VendorProvisioned) that contains the data added by the vendor and adds block 1203 to the blockchain using a hash function as is typically known. Recall that factory provisioned block 606 was added to the blockchain by OEM in step 660.

Figure 15:
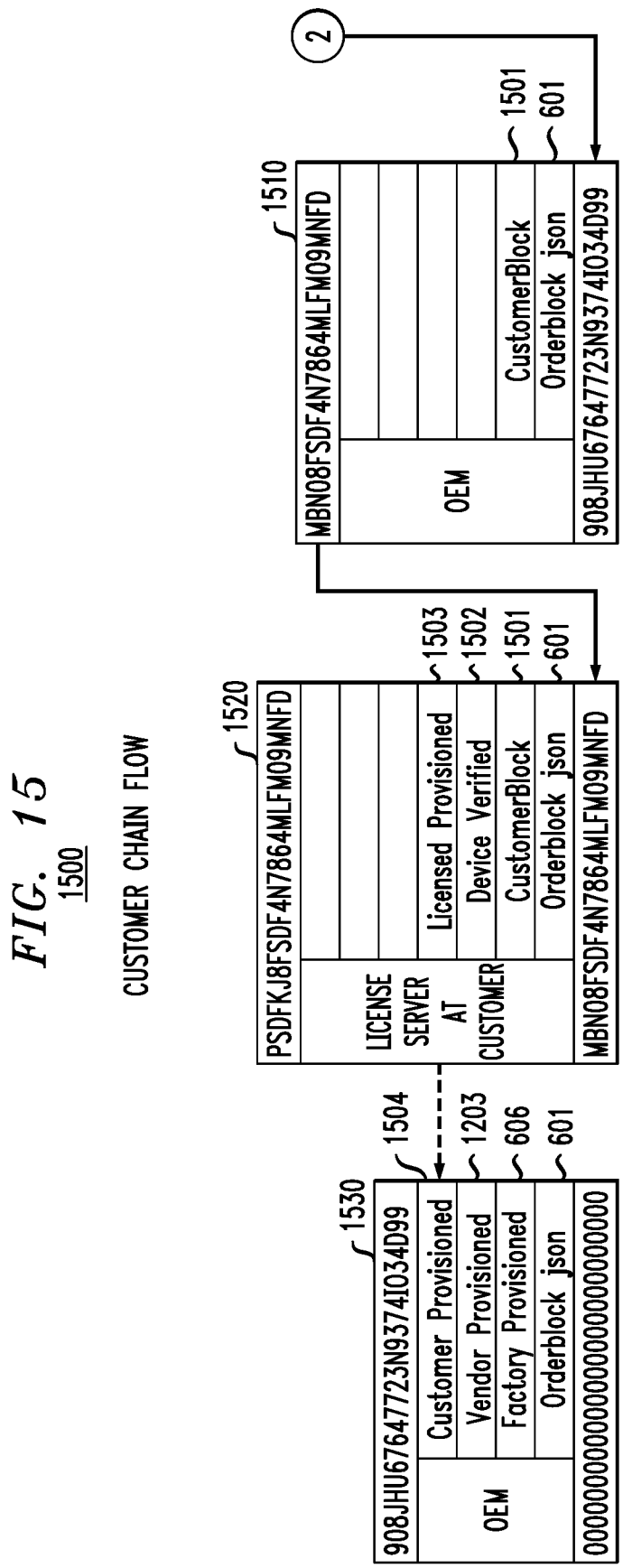
FIG. 15 illustrates a customer partner chain flow according to an illustrative embodiment.

An exemplary vendor chain flow 1500 is shown in FIG. 15. Note that each step in the flow 1500 also illustrates the network node that generates the data along with its corresponding blockchain instance. Note also that the flow 1500 references back to step 610 of FIG. 6. More particularly, after OEM creates order block 601 in step 610, OEM further initiates a customer (child) block 1501 (CustomerBlock) in step 1510 with one or more customer placeholders as explained above. Customer block 1501 is encrypted with the secret code based on the machine specific values generated by the factory with Base64 encoding logic, as described above. An example of block 1501 is shown in JSON format file 1600 in FIG. 16. OEM adds block 1501 to the blockchain using a hash function as is typically known.

In step 1520, the customer (license enforcer at customer site which can be part of the license server or separate therefrom) reads block 1501 and updates any customer placeholders with appropriate information. More particularly, the license enforcer first reads the header block, replaces it with the correct value from the machine, and then regenerates the key. Using that key, the license enforcer decrypts the encrypted information, which then gives the license enforcer all the details to go ahead and unlock the features. For example, once decrypted, the license enforcer receives the data as shown in JSON file format 1700 in FIG. 17 and unlocks the features (activates purchased functionalities). First, the license block is used to unlock the VxRail server for 5 users, 8 nodes, Second, the license block is used to unlock Power Protect software and bind it to the service tag. Third, the license block is used to get the license key using the URL and unlock VCF.

Once the licenses are provisioned on the customer side, the customer generates a device verified block 1502 (DeviceVerified) and a license provisioned block 1503 (LicenseProvisioned) and adds them to the blockchain using a hash function as is typically known, such that OEM will be made aware and will close the license lifecycle.

In step 1530, OEM creates a customer provisioned block 1504 (CustomerProvisioned) that contains the data added by the customer and adds block 1504 to the blockchain using a hash function as is typically known. Recall that factory provisioned block 606 and vendor provisioned block 1203 were added to the blockchain by OEM in step 660 (FIG. 6) and step 1230 (FIG. 12).

FIG. 18 illustrates customer location (site) 1800 in an illustrative embodiment wherein a license server 1810 verifies system devices and provisions licenses based on the data accessed as shown in FIG. 17. More particularly, license server 1810 reads blockchain instance 1812 received from OEM, decrypts the features and verifies the devices that are part of the order in step 1814. First, the license data is used to unlock the VxRail server for 5 users, 8 nodes (shown in steps 1816 and 1818). Second, the license data is used to unlock Power Protect software and bind it to the service tag (shown in steps 1820 and 1822). Third, the license data is used to obtain the license key using the URL and unlock VCF (steps 1824 and 1826). Recall that in some illustrative embodiments, license enforcer nodes (see FIG. 4) can be used to assist in the validation and activation operations.

Figure 19:
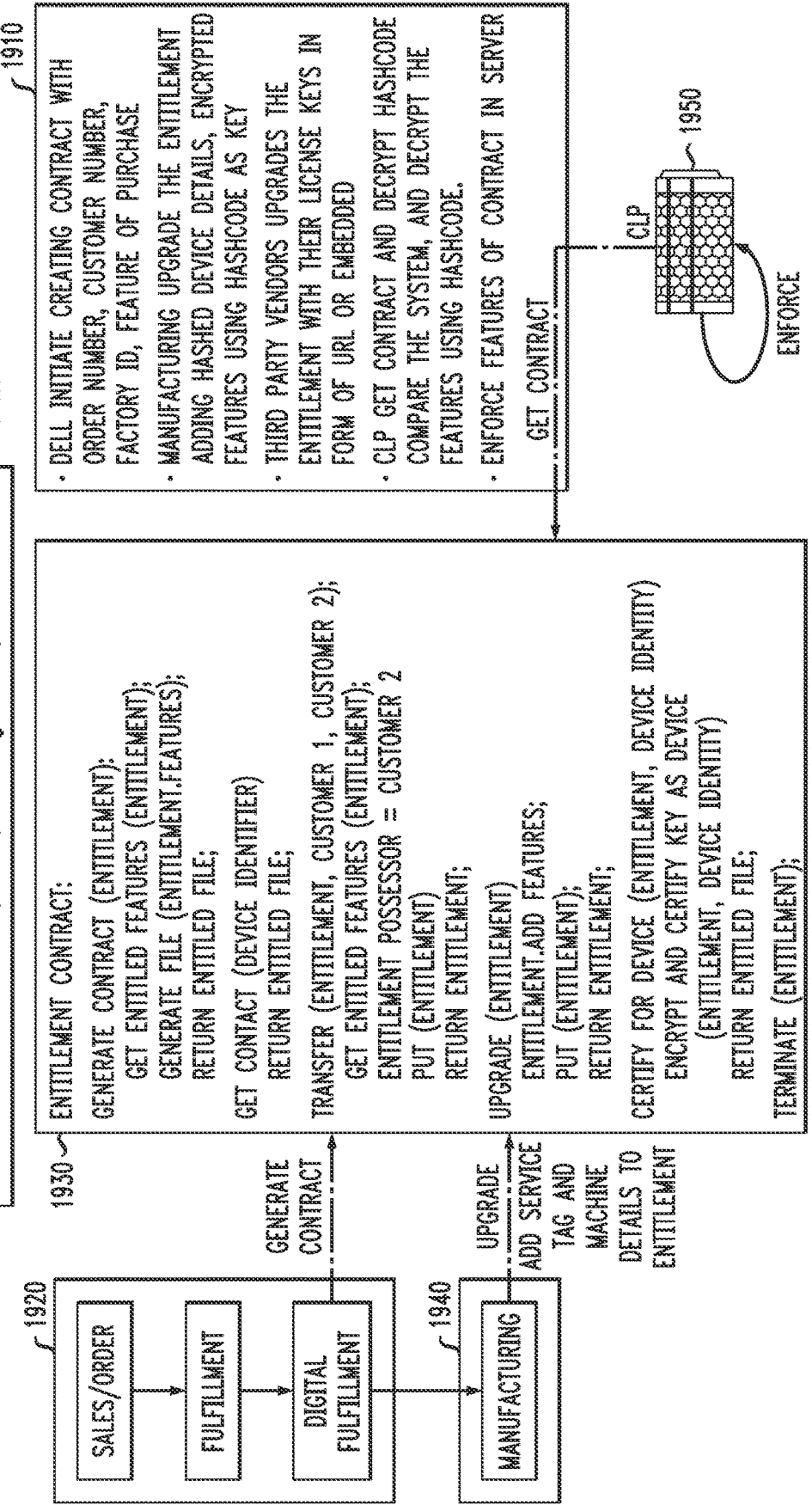
FIG. 19 illustrates an example of upgrading an initial license according to an illustrative embodiment.

As illustrated in example 1900 in FIG. 19, when the customer wants to expand the VxRail system from 5 users to 20 users, advantageously, the OEM only needs to issue another JSON block to the blockchain network with the additional information. An example of an upgrade block is shown as block 1902. More particularly, steps in the upgrade process are depicted in 1910. OEM 1920 generates an entitlement contract, as specified in upgrade process 1910 as part of a block 1930. Factory 1940 reads block 1930 and adds appropriate data, as specified in upgrade process 1910, to the entitlement contract. A license enforcer at the customer site in the form of a common licensing platform (CLP) 1950 reads block 1930 and activates/enforces the upgraded features as appropriate.

In illustrative embodiments, the blockchain network is configured to implement private and restricted access for participants, e.g., the factory can see their order data, and within different factories they should not see others orders. This private/restricted blockchain access is also implemented with respect to vendors and customers. For example, a private permissioned blockchain is used and the OEM controls the blockchain network. As mentioned above, such a blockchain network may be implemented with Hyperledger Fabric, R3 Corda, Ripple or Quorum.

Figure 20:
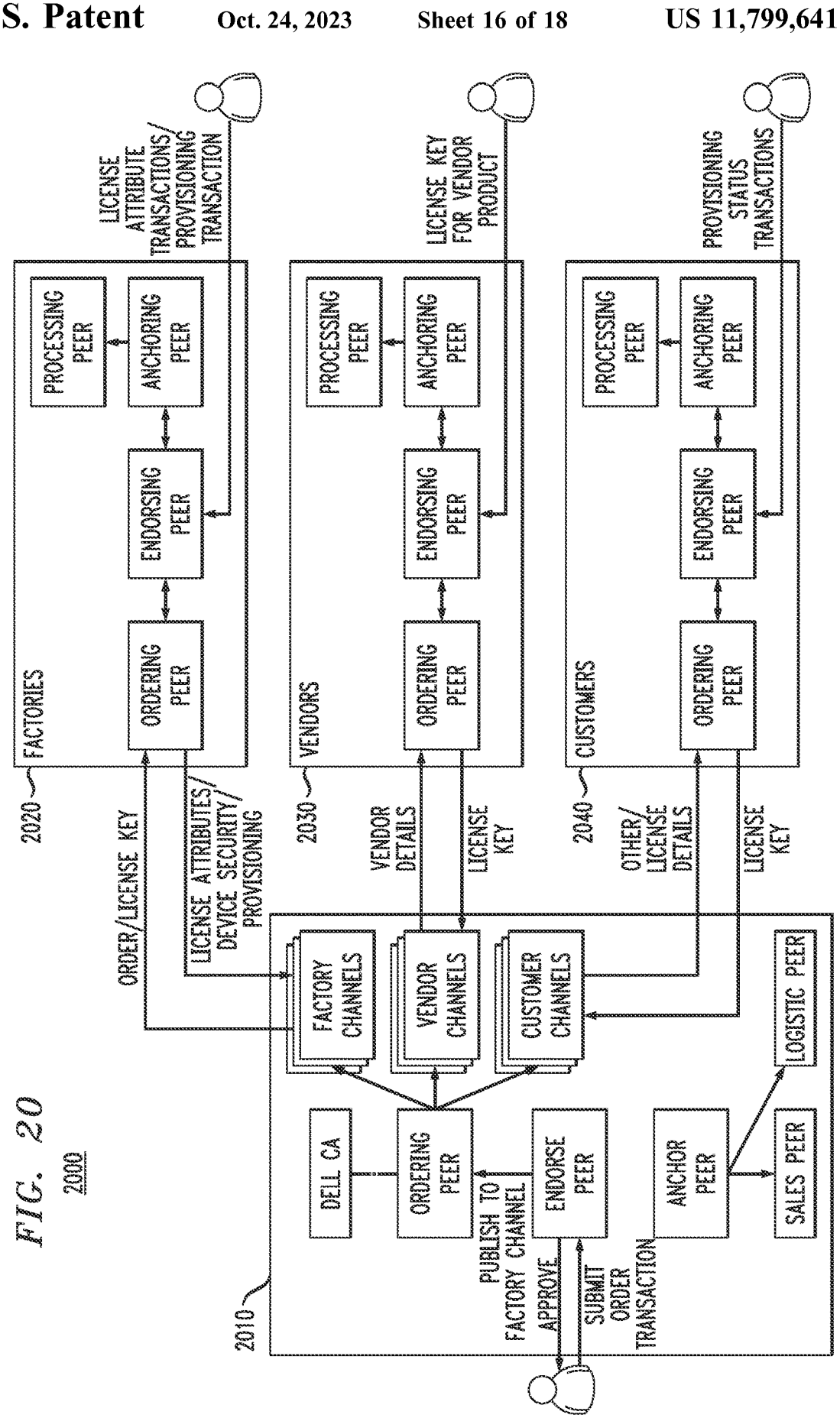
FIG. 20 illustrates a peer-based blockchain architecture for use in activation and enforcement of licensed functionalities according to an illustrative embodiment.
Figure 21:
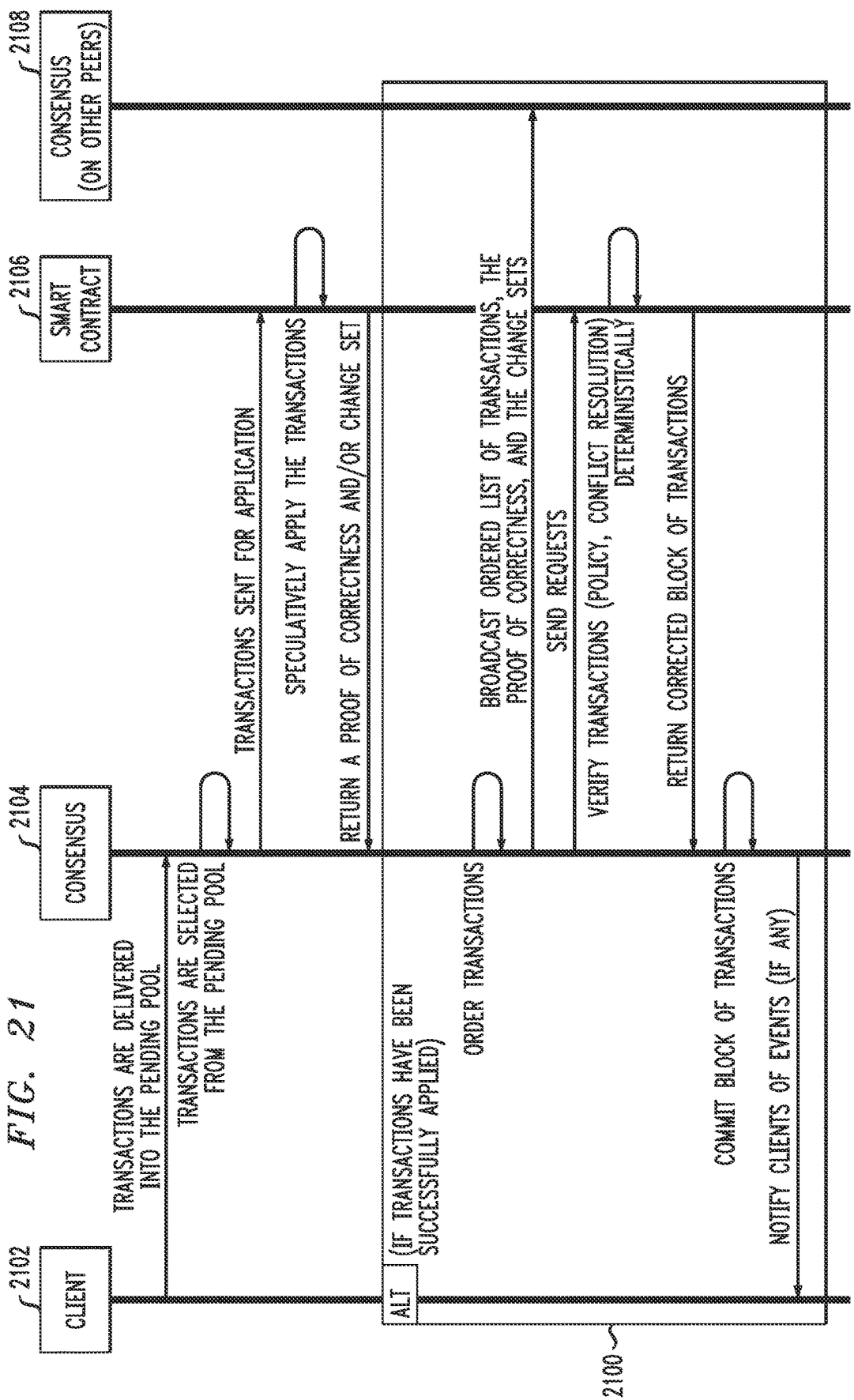
FIG. 21 illustrates a consensus protocol used in a peer-based blockchain architecture according to an illustrative embodiment.

FIG. 20 illustrates a blockchain architecture 2000 with OEM 2010, one or more factories 2020, one or more vendors 2030, and one or more customers 2040. In this embodiment, chain code is defined for each factory/vendor/customers. Endorsing peers at OEM 2010 are responsible for the certification authority (CA) verification, rules and identity, which will execute the respective chain code (smart contract) and approve the transaction. Then, the transaction is placed to an ordering peer which receives updates in the block through respective factory, vendor and customer channels. In a Hyperledger Fabric embodiment, Proof of Elapsed Time (PoET) can be used as the consensus protocol. Further to the blockchain architecture 2000 in FIG. 20, an example of a consensus protocol 2100 is shown in FIG. 21 between a client 2102, a consensus node 2104, a smart contract 2106, and consensus nodes (on other peers) 2108. One of ordinary skill in the art will appreciate how to implement the consensus protocol 2100 of FIG. 21 given the detailed teachings herein.

Furthermore, there are different lifecycles for each type of participant: factory, vendor and customer. By way of example only, as part of the onboarding process of a factory (one or more factories 2020 in FIG. 20), the lifecycle of the transaction can be defined as: Create Channel for Factory→Join Peers in the Org to Factory Channel→Install Chain Code on Peers→Initialize Chain Code on Channel→Place Genesis Block Transaction on Endorse Peer→Validate the Request→Approve/Reject→Submit Block to Ordering Peer→Update the Block for the Channel→Commit The Block in Ledger→Ordering Peer invokes Endorse in Factory→Approve or Reject→Anchor peer distribute this to Generic Processing Peer→Factory Reads the Block→Update with the detail in place Holder <<FF>> and Encrypt the Device details (Distributed Key also Checks the Device security)→Initiate transaction on Endorsing Peer→Approve/Reject→Commit Transaction in Ledger-→Anchor Peer publish to Generic Processing Peer→Dell Reads→Update the License Keys with attribute passed→Endorse Peer→Approve/Reject→Commit Transaction→Factory Provisions→Dell (OEM) Get Updates→Life Cycle completes when Dell mart the order transaction.

In a similar manner, each vendor (one or more vendors 2030 in FIG. 20) and each customer (one or more customers 2040) have their own channels, consensus, channel code (smart contract) defined. The lifecycles are similar to the factory lifecycle, however, the chain code is different. Accordingly, each customer is onboarded in a different channel and chain code.

Many advantages flow from the various illustrative embodiments described herein. For example, illustrative embodiments provide distributed license key generation with device security check using a parametrized generic license key approach over a trusted network with stake holders (customized blockchain network) updating allocated parameter values (placeholders) to create a comprehensive license key(s) for a customer's order.

Illustrative embodiments also provide a distributed license file concept. More particularly, the OEM (provider) generates generic license files with purchasing details for an order and placeholders to partners. The partners update the license file block with their values to make the license file complete (e.g., factory updates the service tag, serial number, secret code and other manufacturing specific values; vendor updates with their license keys in the form of a license URL or embedded license; customer-side license enforcer generates the secret code to decrypt and add customer details).

Illustrative embodiments provide a generic file format (by way of example only, JSON file format) that enables uniform activation and enforcement. Also, the license file ensures that what the OEM ships is what the customer gets by using a secret key and license information encryption techniques over a blockchain network.

The particular processing operations and other system functionality described in conjunction with FIG. 1-21 are presented by way of illustrative example only, and should not be construed as limiting the scope of the disclosure in any way. Alternative embodiments can use other types of processing operations involving devices, systems and functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another within a given information processing system.

Processes and operations described herein can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system described herein may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components described herein can be implemented for use by tenants of such a multi-tenant environment.

As mentioned previously, cloud infrastructure as disclosed herein can include cloud-based systems. Virtual machines provided in such systems can be used to implement illustrative embodiments. These and other cloud-based systems in illustrative embodiments can include object stores.

Illustrative embodiments of processing platforms will now be described in greater detail with reference to FIGS. 22 and 23.

Figure 22:
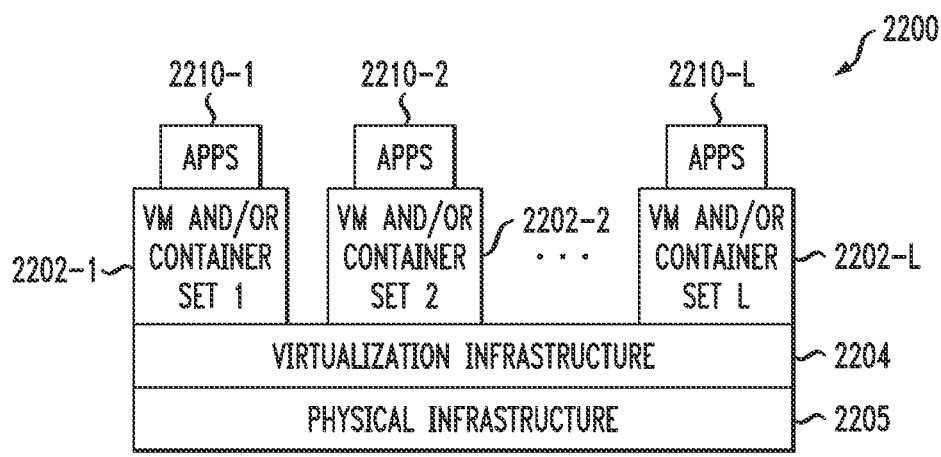
FIGS. 22 and 23 illustrate examples of processing platforms that may be utilized to implement at least a portion of an information processing system according to one or more illustrative embodiments.
Figure 23:
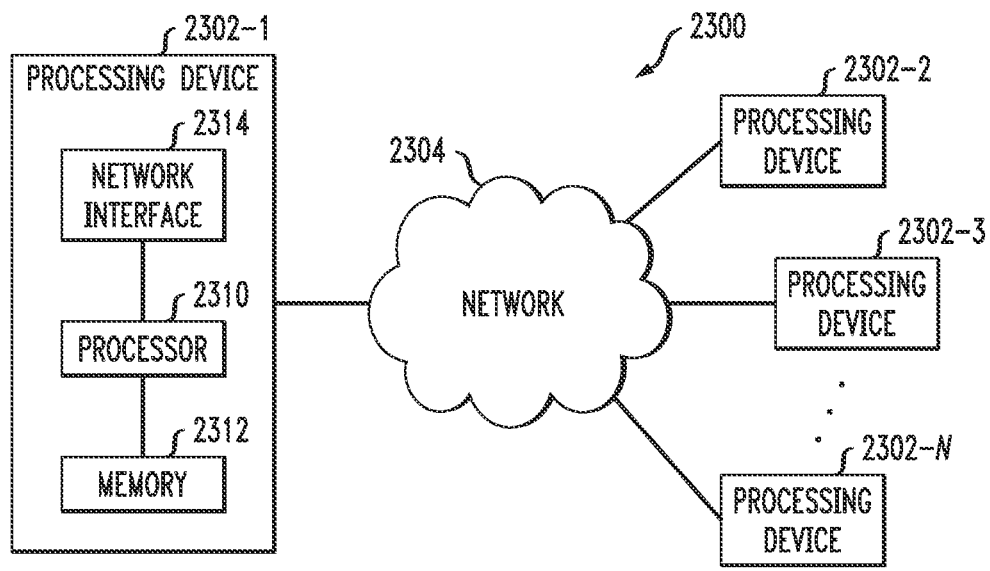

FIG. 22 shows an example processing platform comprising cloud infrastructure 2200. The cloud infrastructure 2200 comprises a combination of physical and virtual processing resources that may be utilized to implement at least a portion of the information processing systems described herein. The cloud infrastructure 2200 comprises multiple virtual machines (VMs) and/or container sets 2202-1, 2202-2, . . . 2202-L implemented using virtualization infrastructure 2204. The virtualization infrastructure 2204 runs on physical infrastructure 2205, and illustratively comprises one or more hypervisors and/or operating system level virtualization infrastructure. The operating system level virtualization infrastructure illustratively comprises kernel control groups of a Linux operating system or other type of operating system.

The cloud infrastructure 2200 further comprises sets of applications 2210-1, 2210-2, . . . 2210-L running on respective ones of the VMs/container sets 2202-1, 2202-2, . . . 2202-L under the control of the virtualization infrastructure 2204. The VMs/container sets 2202 may comprise respective VMs, respective sets of one or more containers, or respective sets of one or more containers running in VMs.

In some implementations of the FIG. 22 embodiment, the VMs/container sets 2202 comprise respective VMs implemented using virtualization infrastructure 2204 that comprises at least one hypervisor. A hypervisor platform may be used to implement a hypervisor within the virtualization infrastructure 2204, where the hypervisor platform has an associated virtual infrastructure management system. The underlying physical machines may comprise one or more distributed processing platforms that include one or more storage systems.

In other implementations of the FIG. 22 embodiment, the VMs/container sets 2202 comprise respective containers implemented using virtualization infrastructure 2204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 2200 shown in FIG. 22 may represent at least a portion of one processing platform. Another example of such a processing platform is processing platform 2300 shown in FIG. 23.

The processing platform 2300 in this embodiment comprises a portion of system 100 and includes a plurality of processing devices, denoted 2302-1, 2302-2, 2302-3, . . . 2302-N, which communicate with one another over a network 2304.

The network 2304 may comprise any type of network, including by way of example a global computer network such as the Internet, a wide area network (WAN), a LAN local area network (LAN), a satellite network, a telephone or cable network, a cellular network, a wireless network such as a WiFi or WiMAX network, or various portions or combinations of these and other types of networks.

The processing device 2302-1 in the processing platform 2300 comprises a processor 2310 coupled to a memory 2312. The processor 2310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 2312 may comprise random access memory (RAM), read-only memory (ROM), flash memory or other types of memory, in any combination. The memory 2312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 2302-1 is network interface circuitry 2314, which is used to interface the processing device with the network 2304 and other system components, and may comprise conventional transceivers.

The other processing devices 2302 of the processing platform 2300 are assumed to be configured in a manner similar to that shown for processing device 2302-1 in the figure.

Again, the particular processing platform 2300 shown in the figure is presented by way of example only, and information processing systems described herein may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of information processing systems as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a hardware processor coupled to a memory, the at least one processing device, when executing program code, is configured to:
    generate, at a first node in a distributed ledger network, at least one data object comprising data associated with a system and one or more un-activated functionalities of the system, and the at least one data object further comprising one or more parameter fields configured for one or more other nodes in the distributed ledger network to subsequently insert data therein;
    obtain the at least one data object after data is inserted in the one or more parameter fields by the one or more other nodes; and
    send the at least one data object to an additional node in the distributed ledger network for use in activating the one or more un-activated functionalities of the system;
    wherein the at least one data object obtained after data is inserted in the one or more parameter fields by the one or more other nodes comprises a private value generated from information about the system and inserted by one of the one or more other nodes;
    wherein the first node is associated with an entity providing the system, the additional node is associated with an entity receiving the system, and the one or more other nodes are associated with at least one of an entity manufacturing the system and an entity supplying at least a part of the system; and
    wherein the at least one processing device, when executing program code, is further configured to encrypt the at least one data object using the private value generated from information about the system and inserted by one of the one or more other nodes prior to sending the at least one data object to the additional node in the distributed ledger network.

2. The apparatus of claim 1, wherein the information about the system used to generate the private value comprises one or more unique identifiers associated with the system.

3. The apparatus of claim 1, wherein the one or more parameter fields in the at least one data object comprise one or more placeholders, for subsequent insertion by a node of the one or more other nodes associated with the entity manufacturing the system, the one or more placeholders including a service tag of the system, a serial number of the system, and a cryptographic value generated from at least the service tag and the serial number.

4. The apparatus of claim 1, wherein the one or more parameter fields in the at least one data object comprise one or more placeholders, for subsequent insertion by a node of the one or more other nodes associated with the entity manufacturing the system, of a hash value of identities of devices that constitute the system manufactured by the entity, wherein the hash value of the identities of devices that constitute the system are usable to verify originality of the devices in the system when received.

5. The apparatus of claim 1, wherein the one or more parameter fields in the at least one data object comprise one or more placeholders, for subsequent insertion by a node of the one or more other nodes associated with the entity supplying at least a part of the system, of information for activating the part of the system supplied by the entity.

6. The apparatus of claim 1, wherein the distributed ledger network comprises a blockchain network wherein the first node, the one or more other nodes, and the additional node are respective compute nodes of the blockchain network.

7. The apparatus of claim 6, wherein the at least one data object comprises one or more data blocks and wherein the one or more data blocks are in a standardized data format to enable uniform enforcement of the activated one or more functionalities of the system.

8. A method comprising:
generating, at a first node in a distributed ledger network, at least one data object comprising data associated with a system and one or more un-activated functionalities of the system, and the at least one data object further comprising one or more parameter fields configured for one or more other nodes in the distributed ledger network to subsequently insert data therein;
obtaining the at least one data object after data is inserted in the one or more parameter fields by the one or more other nodes; and
sending the at least one data object to an additional node in the distributed ledger network for use in activating the one or more un-activated functionalities of the system;
wherein the at least one data object obtained after data is inserted in the one or more parameter fields by the one or more other nodes comprises a private value generated from information about the system and inserted by one of the one or more other nodes;
wherein the first node is associated with an entity providing the system, the additional node is associated with an entity receiving the system, and the one or more other nodes are associated with at least one of an entity manufacturing the system and an entity supplying at least a part of the system;
wherein the method further comprises encrypting the at least one data object using the private value generated from information about the system and inserted by one of the one or more other nodes prior to sending the at least one data object to the additional node in the distributed ledger network; and
wherein the generating, obtaining, and sending are performed by at least one processing device comprising a processor coupled to a memory executing program code.

9. The method of claim 8, wherein the information about the system used to generate the private value comprises one or more unique identifiers associated with the system.

10. The method of claim 8, wherein the one or more parameter fields in the at least one data object comprise one or more placeholders, for subsequent insertion by a node of the one or more other nodes associated with the entity manufacturing the system, the one or more placeholders including a service tag of the system, a serial number of the system, and a cryptographic value generated from at least the service tag and the serial number.

11. The method of claim 8, wherein the one or more parameter fields in the at least one data object comprise one or more placeholders, for subsequent insertion by a node associated with the entity manufacturing the system, of a hash value of identities of devices that constitute the system manufactured by the entity, wherein the hash value of the identities of devices that constitute the system are usable to verify originality of the devices in the system when received.

12. The method of claim 8, wherein the one or more parameter fields in the at least one data object comprise one or more placeholders, for subsequent insertion by a node of the one or more other nodes associated with the entity supplying at least a part of the system, of information for activating the part of the system supplied by the entity.

13. The method of claim 8, wherein the distributed ledger network comprises a blockchain network wherein the first node, the one or more other nodes, and the additional node are respective compute nodes of the blockchain network, and further wherein the at least one data object comprises one or more data blocks in a standardized data format to enable uniform enforcement of the activated one or more functionalities of the system.

14. An article of manufacture comprising a non-transitory processor-readable storage medium having stored therein program code of one or more software programs, wherein the program code when executed by a processing device causes said processing device to:
generate, at a first node in a distributed ledger network, at least one data object comprising data associated with a system and one or more un-activated functionalities of the system, and the at least one data object further comprising one or more parameter fields configured for one or more other nodes in the distributed ledger network to subsequently insert data therein;
obtain the at least one data object after data is inserted in the one or more parameter fields by the one or more other nodes; and
send the at least one data object to an additional node in the distributed ledger network for use in activating the one or more un-activated functionalities of the system;
wherein the at least one data object obtained after data is inserted in the one or more parameter fields by the one or more other nodes comprises a private value generated from information about the system and inserted by one of the one or more other nodes;
wherein the first node is associated with an entity providing the system, the additional node is associated with an entity receiving the system, and the one or more other nodes are associated with at least one of an entity manufacturing the system and an entity supplying at least a part of the system; and
wherein the program code when executed by the processing device further causes said processing device to encrypt the at least one data object using the private value generated from information about the system and inserted by one of the one or more other nodes prior to sending the at least one data object to the additional node in the distributed ledger network.

15. The article of manufacture of claim 14, wherein the information about the system used to generate the private value comprises one or more unique identifiers associated with the system.

16. The article of manufacture of claim 14, wherein the one or more parameter fields in the at least one data object comprise one or more placeholders, for subsequent insertion by a node of the one or more other nodes associated with the entity manufacturing the system, the one or more placeholders including a service tag of the system, a serial number of the system, and a cryptographic value generated from at least the service tag and the serial number.

17. The article of manufacture of claim 14, wherein the one or more parameter fields in the at least one data object comprise one or more placeholders for subsequent insertion by the node associated with the entity manufacturing the system of a hash value of identities of devices that constitute the system manufactured by the entity, wherein the hash value of the identities of devices that constitute the system are usable to verify originality of the devices in the system when received.

18. The article of manufacture of claim 14, wherein the one or more parameter fields in the at least one data object comprise one or more placeholders, for subsequent insertion by a node of the one or more other nodes associated with the entity supplying at least a part of the system, of information for activating the part of the system supplied by the entity.

19. The article of manufacture of claim 14, wherein the distributed ledger network comprises a blockchain network wherein the first node, the one or more other nodes, and the additional node are respective compute nodes of the blockchain network.

20. The article of manufacture of claim 19, wherein the at least one data object comprises one or more data blocks and wherein the one or more data blocks are in a standardized data format to enable uniform enforcement of the activated one or more functionalities of the system.

\* \* \* \* \*